United States Patent [19]
Colten

[11] 4,117,305
[45] Sep. 26, 1978

[54] HEAT SUMP SYSTEM FOR BUILDING STRUCTURES

[75] Inventor: Jerrold L. Colten, Lakewille, Ind.

[73] Assignee: Bristol Products, Inc., Bristol, Ind.

[21] Appl. No.: 780,368

[22] Filed: Mar. 23, 1977

[51] Int. Cl.² ............................................. H05B 1/00
[52] U.S. Cl. ...................................... 219/213; 165/53
[58] Field of Search .................... 219/213; 165/45, 47, 165/48, 53

[56] References Cited

U.S. PATENT DOCUMENTS

| | | | |
|---|---|---|---|
| 2,332,227 | 10/1943 | Jackson | 165/45 X |
| 3,527,921 | 9/1970 | Voglesonger | 219/213 |
| 4,000,851 | 1/1977 | Heilemann | 165/45 X |

FOREIGN PATENT DOCUMENTS 366,219  2/1932  United Kingdom ..................... 219/213

OTHER PUBLICATIONS

J. F. McPartland, Electric Radiant Heating in Floor, Electrical Construction and Maintenance, vol. 69, No. 9, pp. 110-113, 9/70.

German Printed Application 1565, 202, 2/5/70.
German Printed Application 2,351,080, 4/24/75.

*Primary Examiner*—C. L. Albritton
*Attorney, Agent, or Firm*—Marmaduke A. Hobbs

[57] ABSTRACT

A heat sump system for building structures in which side walls for a space for fill material, preferably of a granular nature such as sand, and a thermal insulating material is disposed between the fill material and the earth to prevent the escape of heat generated in the fill material normally generated by an electrical heating cable. An insulating material may be disposed around the periphery of the fill material along the side walls around the building foundation. The insulating material is also preferably impervious to moisture to prevent the transfer of moisture from the earth and the side walls to the fill material. While the electrical heating cable, which may be disposed throughout a major portion of the fill material on a horizontal plane, is preferably embedded in the fill material, it may be disposed between the fill material and a concrete slab disposed thereon, or disposed in the concrete slab.

9 Claims, 4 Drawing Figures

U.S. Patent  Sept. 26, 1978  Sheet 2 of 2  4,117,305
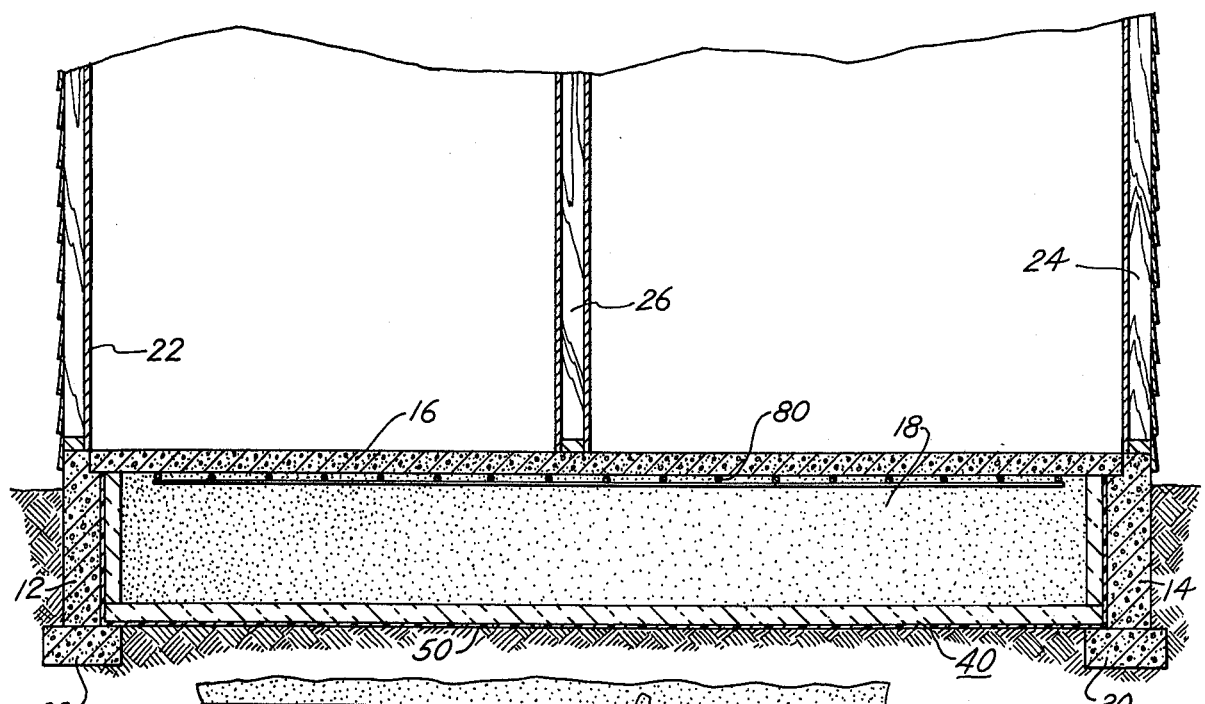
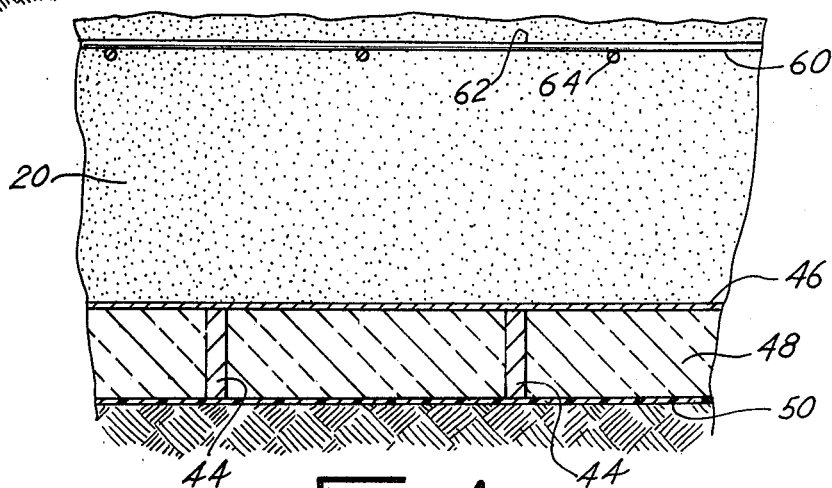

HEAT SUMP SYSTEM FOR BUILDING STRUCTURES

In the housing industry, homes have been built in which the heating system consists of an electrical heating cable buried in sand or other material beneath a concrete slab floor, the material beneath the floor storing the heat generated from time to time by the electrical heating system, and gradually releasing the heat through the concrete floor throughout the day and night. This type of heating system, which usually provides a rather uniform heat supply to the living space of the building, is generally more economical than the conventional electrical heating system, which primarily heats the air in the living space from a centrally located heating unit, or by separate space heating units in the various rooms of the house. The use of the electrical system to heat the material under the floor permits the electrical system to be operated during the hours of low electrical demand from the electric power companies, and to be inoperative or on low output during times of peak demand. Further, radiation of heat from the material below the floor upwardly through the floor dissipates the heat where it is most needed and best utilized for effective heating of the living space and for optimum comfort of those in the living space.

While the heat storage type system just described has a number of advantages, there are some disadvantages which seriously decrease the potential efficiency, and hence the acceptance, of that type of system in homes where it could otherwise be effectively used. One of the problems of the foregoing electric heating systems is the loss of heat downwardly into the earth or ground, in that the only effective barrier from such loss is the thermal impedance of the earth itself. Since the normal ground temperature is approximately 55°, which is substantially below the temperature which must be maintained in the storage material beneath the floor for effectively heating the living space, there is significant downward flow of heat which can never be recovered to any appreciable degree, regardless of the length of time the system is in operation. This downward heat loss is aggravated by the presence of a substantial amount of moisture in the earth beneath the material in which the electrical cable is embedded. It is therefore one of the principal objects of the present invention to provide a heat sump system for building structures, which effectively minimizes the heat loss from the system to the earth, particularly to the earth beneath the system, and which is economical to construct and operate.

Another object of the invention is to provide a heat sump system which includes a barrier to the flow of heat from the system downwardly into the earth where it cannot be recovered when needed to heat the living space and to the passage of moisture from the earth beneath the system upwardly into the system where it could decrease efficiency, and which substantially improves the performance and efficiency of the aforementioned type of heating system.

Still another object is to provide a heat sump system of the aforesaid type which is simple to construct and operate and virtually service free, and which will give optimum performance over extended periods of time with no attention, and yet is responsive to the heat requirements of the living space above the sump system.

The invention is primarily concerned with a heating system in which an electric heating cable is buried in fill material such as sand, beneath a concrete slab floor. The heating cable heats the material, which is preferably about one to three feet in depth and is confined on all lateral sides by a retainer wall, normally of concrete and usually the foundation of the building structure. The present concept involves the use of a thermal barrier to eliminate or minimize the loss of heat downwardly into the earth below the fill material, so that substantially all of the heat generated by the electric heating cable is available for radiating upwardly through the fill material and floor into the living space of the building structure. While the concrete foundation forming the lateral sides of the heat sump serves as a barrier to exclude moisture and to reduce heat loss between the fill material and the surrounding earth or atmosphere, preferably an additional barrier to both moisture and heat loss is included along the lateral sides, normally along the inside surface of the foundation.

A number of objects of the invention have been set forth hereinabove, and other objects and advantages of the invention will become apparent from the following description and accompanying drawings, wherein:

FIG. 3 is a vertical cross sectional view of a further modified form, showing the electrical heating cable disposed between the concrete floor slab and the fill material therebelow; and FIG. 4 is an enlarged vertical cross sectional view of the heat sump system, the section being taken on line 4 — 4 of FIG. 1.

Figure 1:
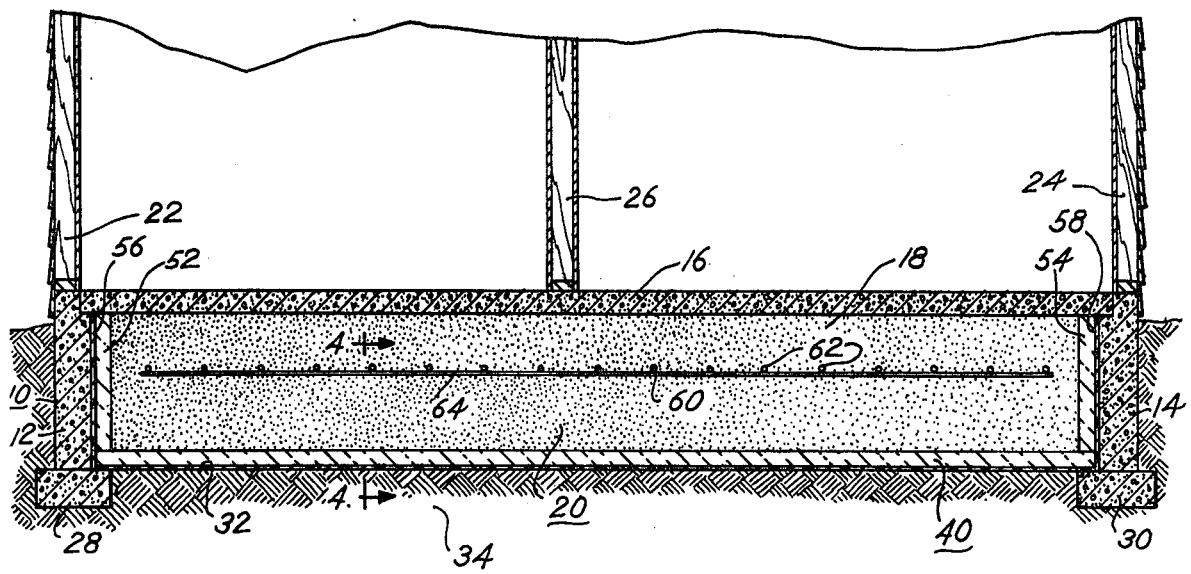
FIG. 1 is a vertical cross sectional view through a lower portion of a building such as a home, showing the foundation and footings in the ground and the electrical heating cable embedded in the material beneath a concrete floor slab.

Referring more specifically to the drawings, the building structure shown consists basically of a foundation 10 having vertical side walls 12 and 14. The floor 16 of the building structure consists of a concrete slab laid on fill material 18 which forms a part of the heat sump indicated generally by numeral 20. Outside walls 22 and 24 and wall partition 26 are shown supported by the foundations and on the concrete slab. Foundation sides 12 and 14 are supported by footings 28 and 30, respectively, and are poured in trenches made at the time the excavation for the building is made. For the purpose of the present invention, this construction is considered conventional and will not be described in further detail. The present heat sump system is adaptable to a variety of different types of buildings, including single and multiple family homes, and commercial and industrial buildings; however, the description herein will be directed primarily to the application of the invention to home structures.

After the excavation for the foundation and heat sump system 20 has been dug down to surface 32 of the earth 34, a layer of thermal insulating material 40 is laid over all of surface 32. The insulating material may be of a variety of different substances, preferably cellular polyurethane, of sufficient strength to support fill material 18 and concrete slab 16. As an alternative, the insulating material structure may be constructed of intermittent support members 44 with an upper panel or sheet 46 and porous insulating material such as fiberglass 48 interposed between the supports. The spaced support members such as those indicated by numeral 44 and panel or sheeting 46 provide full support for the fill material, slab and any other portions of the building structure placed on these parts. Partitions 44 may be of concrete or treated wood, and panel or sheet 46 may be constructed of treated plywood or metal, or may be of a concrete slab construction if desired. In any event, the thermal insulating structure must have substantial thickness, preferably at least four inches for example, and be capable of withstanding moisture and not be subject to rot or disintegration under adverse conditions over long periods of time. While the foregoing thermal insulating structures illustrate suitable ways of providing the desired thermal barrier, other types of thermal insulating structures may be used if they satisfy both the thermal and strength requirements, and the insulating structure normally would be between about 2 and 6 inches in thickness; however, the thermal characteristic of the material used determines the amount of such material used. Different types of reinforcement may be required for different insulating materials, to obtain the required strength to support the fill material and slab thereon.

In order to seal the heat sump 20 from moisture to prevent the ground moisture from rising and flowing into the fill material, a plastic sheet 50 is preferably placed beneath the thermal insulating material where it will most effectively afford protection to the thermal insulating material, as well as minimize the flow of moisture from the ground into the fill material. Excluding the moisture is preferable, both in maintaining effective insulating characteristics of the thermal insulating material and in maintaining effective heat retaining characteristics in the fill material 18.

In addition to the thermal insulating material 40, insulating materials 52 and 54 are preferably installed along the inner surface of foundation sides 12 and 14 to minimize the loss of heat through the concrete foundation. Moisture barriers 56 and 58 are also preferably disposed between the concrete and the respective thermal barriers to reduce the inflow of moisture into the sides of the heat sump.

In the embodiment of FIG. 1, an electric heating system, indicated generally by numeral 60, consists of a plurality of spaced straight electric cable sections 62 preferably buried about one foot beneath the concrete slab. In the embodiment illustrated in the drawings, the thickness of the fill material 18 is approximately 28 inches, with the electric cable being disposed approximately half-way from the top to the bottom of the material. In order to assist in laying the cable, it may be mounted on a carrier 64, the carrier and cable assembly normally being fabricated in a plant and rolled for shipping and then unrolled onto the surface of the half filled fill material in the excavation. While the heating system is normally electrical, the system may be either of the steam or hot water types in which conduits are embedded in the same places as the electrical cable sections.

In the operation of the installation illustrated in FIG. 1, the electrical heating system is operated as the heat requirements in the living space above are indicated; however, the heat sump may be most economically operated by heating the fill material at off peak periods of electrical demand at the power company, to store the heat for gradual release from the fill material through the concrete slab into the space above. Since the cable is disposed at least several inches below the concrete floor, a relatively slow response from the electrical system is obtained, since a period of time is required for the heat to flow from the electric heating cable through the fill material and concrete slab into the living space thereabove. However, an effective, prolonged heat release is obtained as a result of this type of structure so that a relatively even heat is obtained from the heat sump through the concrete slab floor.

Figure 2:
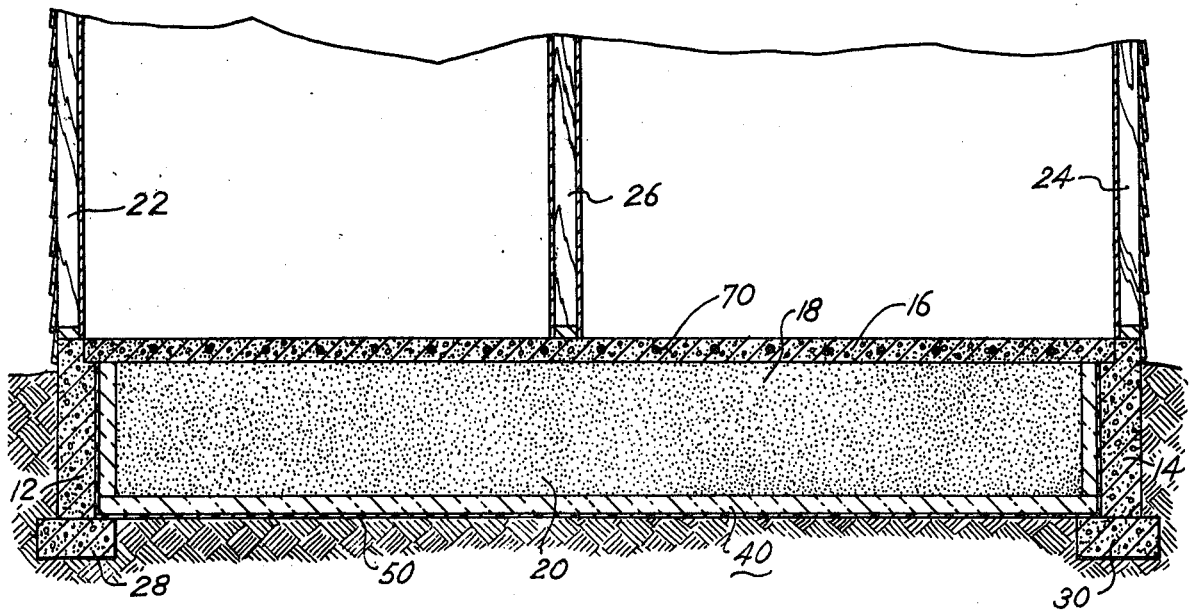
FIG. 2 is a vertical cross sectional view similar to FIG. 1, showing a modified form of the present invention with the electrical heating cable embedded in a concrete floor slab.

The embodiment of the invention illustrated in FIG. 2 is similar in many respects to that illustrated in FIG. 1, and consequently like numerals will be used to identify like parts. In the embodiment of FIG. 2, the electrical heating system identified by numeral 70 is disposed in the concrete slab 16. The heat from the electrical heating cable of the heating system radiates through the floor upwardly into the living space and downwardly into the heat sump 20, where it is stored for prolonged release when the electrical system is not in operation. While this system provides a more ready availability of the heat from the electrical system, it also furnishes the sump with heat for gradual release of heat when the electrical system is not in operation. The characteristics of the fill material 18 and insulating materials 40, 52 and 54 are the same as those previously described, and they perform the same function in the embodiment illustrated in FIG. 2 as that illustrated in FIG. 1.

The embodiment of the invention illustrated in FIG. 3 is similar to those in the two previous embodiments described herein, and hence like numerals will be used for like parts. In this embodiment, an electrical heating system 80 is disposed directly beneath the slab 16 on top of the fill material. This arrangement permits relatively rapid response to a call for heat in the living space, while providing some heat retention in the fill material 18 for release when the heating system is not in operation. The structure of the heat sump involving the insulating barriers 40, 52 and 54 performs the same functions as in the previous embodiments illustrated herein.

While several embodiments of the present heat sump system for building structures have been described in detail herein, various changes and further modifications may be made without departing from the scope of the invention.

I claim:

1. A heat sump system for building structures, comprising side walls defining an inner area with earth disposed beneath said area and supporting said side walls, heat absorbing and releasing fill material substantially filling said area and having an upper surface, a slab forming a floor of said building structure supported by said fill material on said upper surface forming a heat exchanging relationship with said fill material, an electrical heating cable for heating said fill material and said slab throughout substantially the full area of said material, a thin sheet of water impervious plastic material beneath said fill material, and a layer of thermal insulating material disposed between said fill material and said sheet of plastic material to form a heat flow barrier for minimizing the loss of heat from said fill material into the earth.

2. A heat sump system for building structures as defined in claim 1 in which said electrical cable is buried in said fill material on a generally horizontal plane throughout a substantial part of the fill material.

3. A heat sump system for building structures as defined in claim 2 in which said electrical cable is disposed in spaced relation with respect to said upper surface and said thermal insulating material.

4. A heat sump system for building structures as defined in claim 1 in which said electrical cable is disposed on a generally horizontal plane in the area of said upper surface adjacent the underside of said slab.

5. A heat sump system for building structures as defined in claim 1 in which said fill material consists of packed granular material.

6. A heat sump system for building structures as defined in claim 1 in which said layer of thermal insulating material has at least a partial cellular structure and has sufficient strength to fully support said fill material and said slab forming said floor.

7. A heat sump system for building structures as defined in claim 6 in which said layer of thermal insulating material is at least two inches in thickness and is substantially impervious to moisture.

8. A heat sump system for building structures as defined in claim 1 in which a layer of thermal insulating material is disposed along the inner surface of said side walls.

9. A heat sump system for building structures as defined in claim 8 in which said layer of thermal insulating material along the side walls is also substantially impervious to moisture.

* * * * *